Oct. 9, 1962 R. E. SCHORNSTHEIMER 3,057,759
METHOD AND APPARATUS FOR REMOVING A SOLUBLE
SUBSTANCE FROM SHEET MATERIAL
Filed Feb. 14, 1956 5 Sheets-Sheet 1

INVENTOR.
ROBERT E. SCHORNSTHEIMER
BY
W. A. Shira, Jr.
ATTY.

Oct. 9, 1962    R. E. SCHORNSTHEIMER    3,057,759
METHOD AND APPARATUS FOR REMOVING A SOLUBLE
SUBSTANCE FROM SHEET MATERIAL
Filed Feb. 14, 1956    5 Sheets-Sheet 4

FIG. 4

INVENTOR.
ROBERT E. SCHORNSTHEIMER
BY
W. A. Shira, Jr.
ATTY.

FIG. 5

INVENTOR.
ROBERT E. SCHORNSTHEIMER
BY
W. A. Shira, Jr.
ATTY.

United States Patent Office 3,057,759
Patented Oct. 9, 1962

3,057,759
METHOD AND APPARATUS FOR REMOVING A SOLUBLE SUBSTANCE FROM SHEET MATERIAL
Robert E. Schornstheimer, Marietta, Ohio, assignor to The B. F. Goodrich Company, New York, N.Y., a corporation of New York
Filed Feb. 14, 1956, Ser. No. 565,455
17 Claims. (Cl. 134—15)

This invention relates to an improved method and apparatus for removing a soluble substance from flexible sheet material and, more particularly, to a procedure and an apparatus for removing embedded soluble particles from impervious flexible sheet material to render the latter air pervious.

Plastic films, either unsupported or provided with fabric backing, are now widely used for upholstery material, rainwear, jackets and other purposes where water imperviousness, durability, attractive appearance and ease of cleaning are important considerations. However, one serious objection to conventional materials of this nature is that they are not air pervious so that moisture in the form of vapor does not pass therethrough but condenses thereon. This results in considerable discomfort to the user, especially in warm weather. Recently, this difficulty was removed by the production of plastic films, either unsupported or fabric backed, which have very small diameter holes therethrough. These holes are so small that, while they will permit passage of air and moisture vapor, they do not pass liquids and hence the material is said to breathe or be air pervious in substantially the same manner as leather.

The nature of the improved plastic sheet materials whereby they are rendered air pervious or breathable, as well as the method of producing such materials, are fully disclosed and claimed in the co-pending application of Donald S. Sarbach, Serial No. 447,857, filed August 4, 1954, which issued as Patent No. 2,809,900 on October 15, 1957. As set forth therein, such material is made by incorporating in the plastic composition a finely divided solid substance which is soluble in a liquid that does not attack the plastic material, the soluble substance being dissolved or washed from the plastic material after the latter has been formed into self supporting sheets or into layers or coating on fabric, thereby leaving fine pores or openings through the material. A specific example of such a materail is a film or layer of vinyl resin, such as polyvinyl chloride, in which finely divided sodium chloride is embedded during the preparation of the film or layer and is thereafter removed by washing with water. While this material is far superior to similar sheet materials which are not air pervious, the removal of the soluble substance to form the pores has been extremely slow and attempts to increase the rate of removal by increasing the temperature of the solvent have resulted in objectionable edge curl or other distortions of the material.

The principal object of this invention is, therefore, to provide an improved method and apparatus for removing a soluble substance from flexible sheet material, such as sheet plastic in either the unsupported or fabric backed form, whereby the rate of removal of the soluble substance is increased many-fold and edge curl or other distortion of the material is substantially eliminated.

A more specific object of the invention is to provide an improved method and apparatus for rendering air pervious flexible sheet material containing a finely divided soluble substance by rapidly reversely flexing contiguous portions of the material while moving it through a flowing body of solvent for the said finely divided substance.

A still more specific object of the invention is to provide an improved method and apparatus for removing a soluble substance from flexible sheet material by repeatedly passing the said material back and forth through a plurality of rolls having intermeshing teeth, the rolls and material being immersed in a solvent for the substance, whereby the material is subjected to repeated reverse flexure of contiguous portions transversely of the path of movement of the material so that substantially all of the soluble substance is rapidly removed from the material.

A further object of the invention is to provide an improved method and apparatus as defined above wherein provision is made to prevent edge curl and uneven windup of the sheet material, thereby reducing spoilage and improving the marketability of the material.

The invention further resides in certain novel steps of procedure and in the combination and arrangements of parts of the apparatus in which the invention is embodied, and further objects and advantages thereof will be apparent to those skilled in the art to which the invention pertains from the following description of the presently preferred embodiment, taken in conjunction with the accompanying drawings forming a part of this application and in which.

In accordance with the method of this invention, flexible sheet or web material, either in the form of unsupported plastic film or of such a film supported upon a fabric backing, and containing a finely divided soluble substance embedded in the plastic material is rendered air pervious by rapid reverse flexing of the material as it is moved through a body of flowing liquid that is a solvent for the soluble substance. This action results in rapidly dissolving the soluble substance from the material thereby providing minute holes or pores through which air and/or moisture vapor may pass but liquid is prevented from passing. The rapid reverse flexing of the material transversely of its path of movement through the solvent is effected by passing the material between fluted or toothed rolls, the teeth of which intermesh with the material therebetween, the rolls being rotated, first in one direction and then in the opposite direction, to move the material through the solvent alternately in reverse directions while effecting the rapid transverse flexing of the material.

In addition to the action of the teeth of the fluted or toothed rolls in causing the aforementioned reverse flexing of the material, these teeth also produce a pumping or impelling action upon the solvent forcing it into contact with the flexing material and thus further facilitating the removal of the soluble substance. This pumping action results from the fact that the intermeshing teeth of a pair of cooperating toothed rolls form pockets in which the material and liquid are received and the capacity of these pockets is decreased as the teeth pass through the common plane containing the axes of two rolls so the liquid is forced into the pores of the material at the same time that the latter are opened and closed by the reverse flexing of the material. If desired, a suitable surface wetting agent or detergent may be added to the solvent to facilitate the action of the latter in removing the soluble substance.

The presently preferred apparatus for performing the method of this invention is illustrated in the drawings as comprising an elongated tank 10, preferably formed of stainless steel or other corrosion resistant material. As here shown, the tank has sloping end walls 11 and 12 and a sloping bottom 13 to facilitate drainage of liquid therefrom through a drain pipe 14 that extends through the end wall 12 substantially centrally thereof and adjacent the bottom 13. A liquid, which is a solvent for the soluble substance to be removed from the material being processed, is introduced into the tank through an inlet pipe 15 connected with the end wall 11 adjacent the bottom thereof, the rate of introduction of the solvent being controlled by a suitable valve 16. The level of the liquid within the tank or container 10 is controlled by providing the end wall 12 of the tank with an overflow pipe 17, which is preferably connected with the pipe 14 and leads to a suitable drain or other place of disposal of the solvent. The rate of flow of the liquid through the tank is controlled both by the valve 16 and by a valve 18 that is provided in the drain pipe 14. The temperature of the liquid within the tank is preferably controlled by providing the inlet pipe 15 with a conduit 19 through which steam or other temperature conditioning fluid is admitted, the rate of introduction of the conditioning fluid being controlled by a valve 20.

Figure 2:
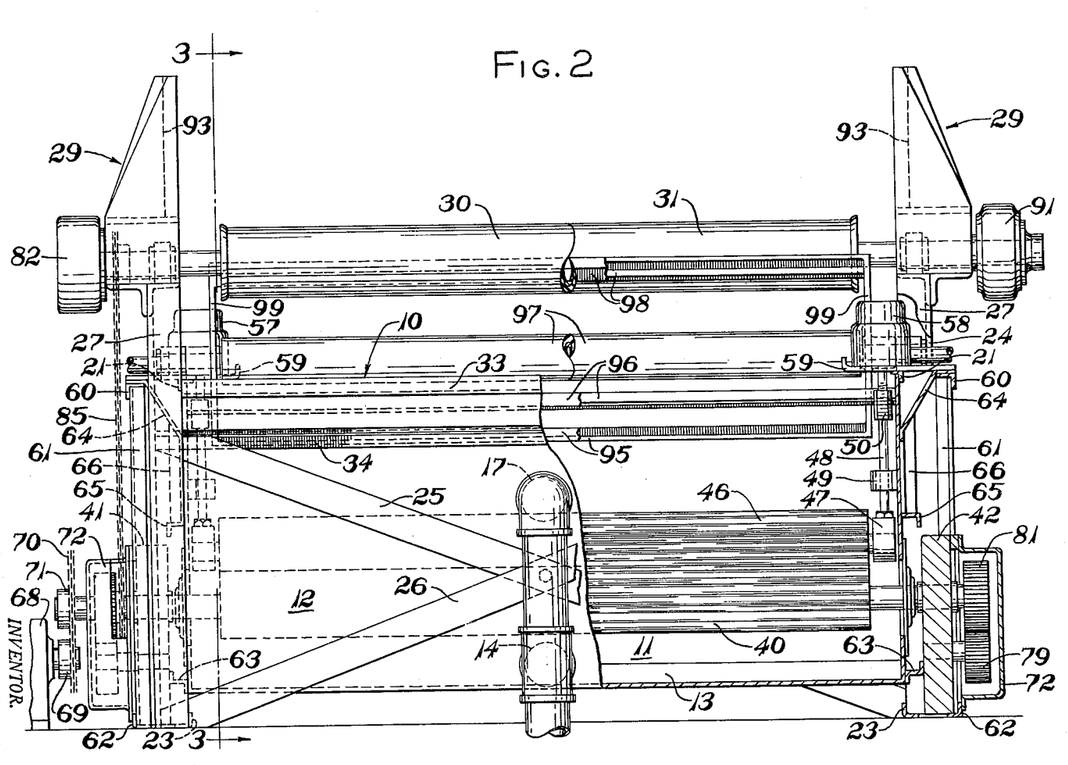
FIG. 2 is an end elevational view of the apparatus shown in FIG. 1 with parts broken away to more clearly show the mechanism.

The tank 10 is supported and reinforced by a suitable framework of structure steel members, preferably angle irons, interconnected together by welding and/or bolting. As here shown, see FIGS. 2 and 3, longitudinally extending angle members 21 are provided along the upper side edges of the tank 10 with the ends of these members extending slightly beyond the upper portions of the sloping sidewalls 11 and 12 and connected with vertically extending angle members 22. The lower ends of the angle members 22 are connected by longitudinally extending angle members 23 which rest upon the floor or other supporting surface. The vertically extending angle members 22 are each secured to vertical supporting standards 24 which are angular in cross-section and have their upper ends extending above the level of the tank 10. The two supporting standards 24 at each end of the apparatus are interconnected by diagonal supporting members 25 and 26.

Figure 1:
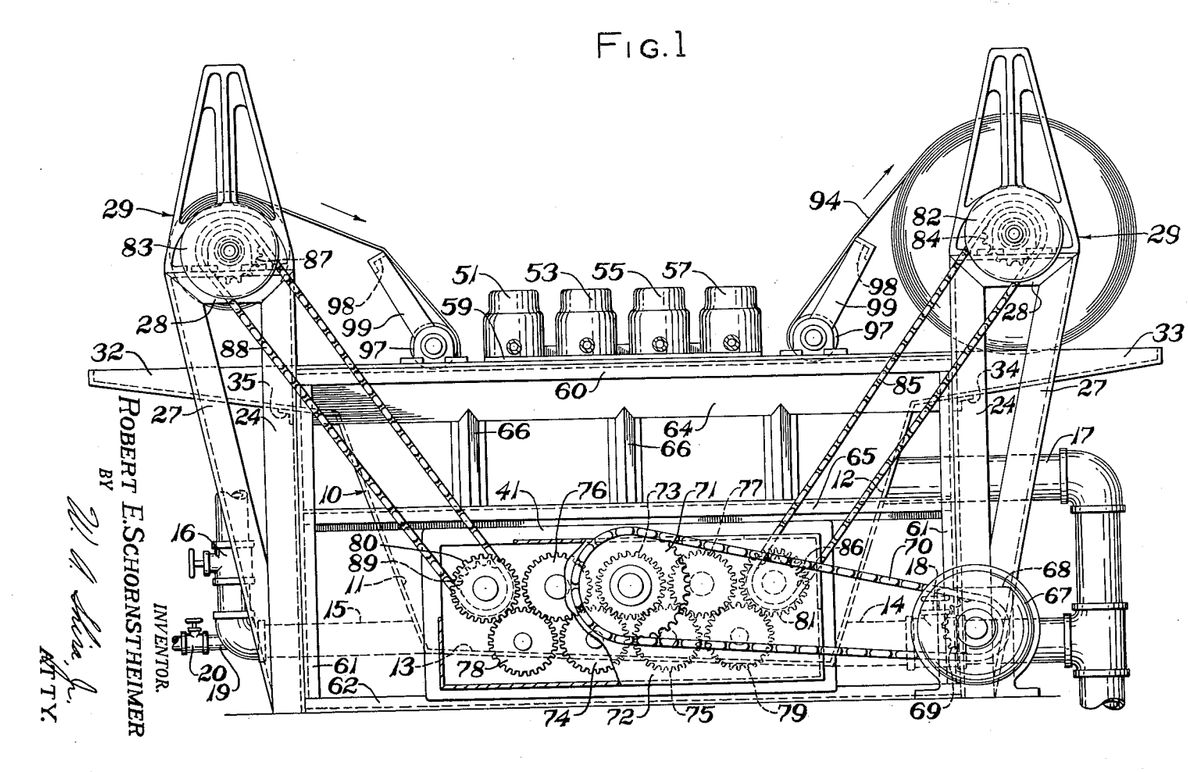
FIG. 1 is a side elevational view of the presently preferred embodiment of an apparatus constructed in accordance with this invention and capable of removing a soluble substance from flexible sheet material by the procedure of this invention, certain portions of the apparatus being broken away to facilitate illustration.

Extending upwardly from the base of each of the supporting members 24, and at a small angle thereto, is a supporting member 27, the upper end of which terminates co-planar with the upper end of the adjacent supporting standard 24. The tops or upper ends of the adjacent supporting members 24 and 27 are interconnected by horizontally extending members 28, see FIG. 1 and the horizontal supporting members 28 are each provided with a pedestal 29 which includes a bearing for a roll. These bearings rotatably support rubber covered rolls 30 and 31 between which the material being treated is moved through the solvent in the tank. Extending beneath the rolls 30 and 31 are drip pan portions 32 and 33 of the tank 10 the bottom surfaces of which portions are inclined at a small angle and are united with the sloping end portions 11 and 12 of the tank, see FIGS. 1 and 3. Angular supporting members 34 and 35 extend transversely of the apparatus beneath the bottoms of these drip pans and the ends of members 34 and 35 are connected with the supporting standards 24.

Figure 3:
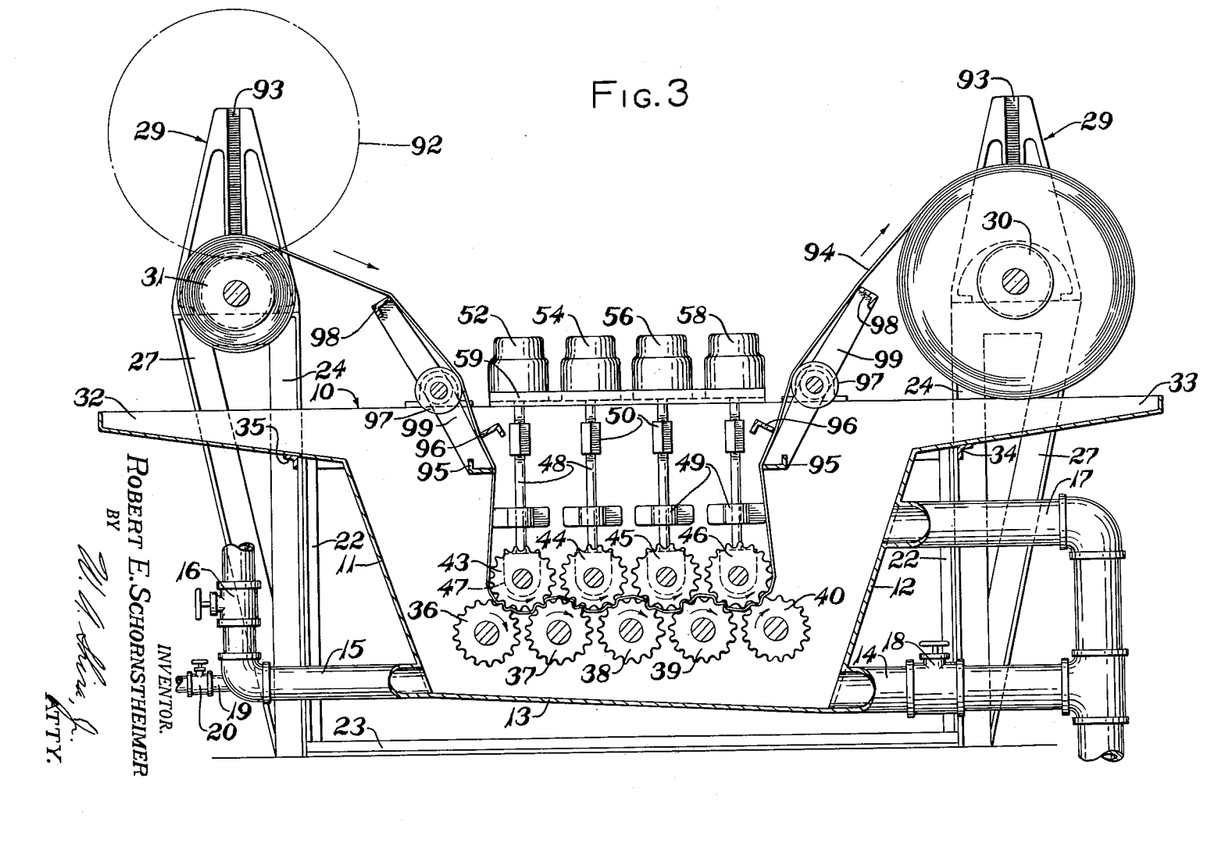
FIG. 3 is a longitudinal sectional view taken substantially on the section line 3—3 of FIG. 2 as viewed in the direction indicated by the arrows.

A plurality of fluted or toothed rolls 36, 37, 38, 39 and 40, extend transversely through the tank 10 adjacent the bottom thereof. As here shown, these rolls have their peripheries provided wtih axially extending flutes or ridges which are in the form of gear teeth of involute shape. The shaft ends of these gear rolls extend through suitable seals at the sides of the tank 10 and are rotatably supported in bearings provided in longitudinally extending castings 41 and 42 that are suitably connected to the supporting framework for the tank. The fluted or toothed rolls 36, 37, 38, 39 and 40 are spaced from each other and do not intermesh. However, removably supported above the toothed rolls 36, 37, 38, 39 and 40, are a second set of toothed rolls 43, 44, 45 and 46, each of which is adapted to mesh with two of the lower set of rolls 36 to 40. Thus, as shown in FIG. 3, the teeth on roll 43 intermesh with the teeth on rolls 36 and 37. The teeth on roll 44 mesh with the teeth on rolls 37 and 38. The teeth on roll 45 mesh with the teeth on rolls 38 and 39, and the teeth on roll 46 mesh with the teeth on rolls 39 and 40.

Figure 4:
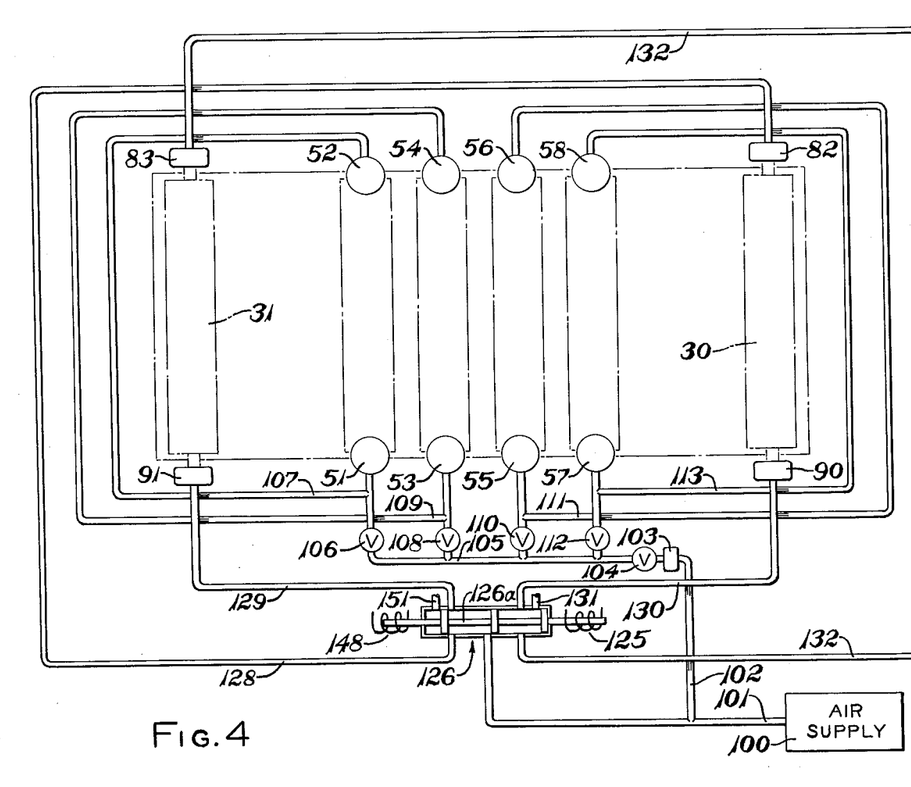
FIG. 4 is a simplified schematic representation of the pneumatic system for controlling operation of the apparatus.

The shafts of the rolls 43, 44, 45 and 46 do not extend externally of the tank 10 but instead the ends thereof are rotatably mounted in bearings, such as 47 (see FIG. 2), provided at the lower end of vertical extending rods 48 which are guided for reciprocating movement in bushings 49 mounted on the internal surfaces of the tank side walls. The upper end of each of the rods 48 is connected with a suitable mechanism for raising and lowering the rods, and hence the rolls supported thereby, to facilitate threading the film of material to be treated between the sets of toothed rolls. Preferably, the rods 48 are made adjustable in length, as by means of oppositely threaded portions engaged in a suitably threaded coupling 50 (see FIGS. 2 and 3), to thereby facilitate adjusting the positions of the rolls in the tank and their meshed relationship with the lower set of rolls. In the preferred embodiment, the means for raising or lowering the upper set of rolls comprise fluid pressure operated pistons contained in cylinders 51, 52, 53, 54, 55, 56, 57 and 58 to which fluid under pressure is selectively or simultaneously applied through valves and interconnecting conduits as schematically illustrated in FIG. 4 and hereinafter more specifically described.

The cylinders 51 to 58, inclusive, are supported along the upper side edges of the tank 10 upon longitudinally extending plates, such as 59, that are connected with the angle members 21 and with similar longitudinally extending angle members 60 which are horizontally spaced from the members 21. The ends of the angle members 60 are connected with vretically extending angle members 61 which are preferably connected together by longitudinally extending angle members 62 resting upon the floor or other support for the apparatus. The bearing supports 41 and 42 may be suitably connected to the supporting members 61 and 62, and the lower portion of the tank 10 is shown connected with the bearing supports 41 and 42 by suitable connecting members 63, see FIG. 2. Plates 59 may be further reinforced by longitudinally extending, angularly disposed braces 64, which in turn, are connected with horizontally extending angle members 65 by spaced vertically extending supporting members 66 which are substantially triangular in cross section, see FIG. 1.

The gear rolls 36 to 40, inclusive are positively driven by a reversible electric motor 67 through a gear reduction unit 68 the output shaft of which is provided with a sprocket 69 connected by a chain 70 to a sprocket 71 provided on the outer end of the shaft for the gear roll 38. Intermediate the sprocket 71 and the adjacent bearing support 41 for the gear rolls is a removable gear cover 72 within which is disposed a gear 73 upon the shaft of the gear roll 38. The gear 73 meshes with gears 74 and 75 that are rotatably supported upon suitable stub or jackshafts carried by the shaft bearing support 41. The gear 74 also meshes with a gear 76, connected with the end of the gear roll 37, while the gear 75 meshes with a gear 77 that is provided on the adjacent end of the gear roll 39. The gear 76 meshes with a gear 78 and the gear 77 meshes with a gear 79, the gears 78 and 79 being rotatably supported on the bearing support 41 by suitable stub or jack shafts. The gear 78 meshes with a gear 80 provided on the adjacent end of the gear roll 36 and the gear 79 meshes with a gear 81 provided on the adjacent end of the gear roll 40. It will thus be evident that, when the motor 67 is rotating in one direction, the lower set of gear rolls 36, 37, 38, 39 and 40 are positively driven. This will, in turn, drive the gear rolls 43, 44, 45 and 46 when the latter are intermeshed with the lower set of gear rolls substantially as shown in FIG. 3. In order to prevent undue axial twisting of the gear rolls and to equalize the torques thereon, the opposite ends of the lower set of gear rolls may be provided with a gear train similar to that just described for the train containing the gears 73 to 81.

The rolls 30 and 31, between which the material is moved through the solvent in the tank 10, are adapted to be selectively driven in timed relationship with respect to the rotation of the gear rolls by suitable driving connections therebetween. In the form of the apparatus illustrated in the drawings, this is accomplished by providing one end of each shaft of the rolls 30 and 31 with an air operated clutch, 82 and 83 respectively. The clutch 82 for the roll 30 is provided with a sprocket 84 that is connected through a chain 85 with a sprocket 86 provided upon the shaft for the gear roll 40, see FIG. 1. In a similar manner, the clutch 83 for roll 31 has a sprocket 87 that is connected by a chain 88 to a sprocket 89 provided on the shaft of gear roll 36. It will be apparent therefore, that when the motor 67 is rotating the gear rolls, engaging one of the clutches and disengaging the other results in driving the roll associated with the engaged clutch thus facilitating winding of the material onto that roll and release of the material from the other roll. The actual movement of the material through the tank is not, however, effected by pull thereon exerted by the driven take-up roll 30 or 31, but rather by the action of the rotating gear rolls within the tank, the clutches 82 and 83 being such that the engaged one thereof will slip before exerting sufficient pull upon the material to move it between the teeth of the gear rolls in the absence of rotation of the latter.

In order to prevent overrunning of the material from the roll 30 or 31 from which the material is being removed, each of the rolls 30 and 31 is provided with a fluid pressure operated brake 90, 91 respectively, see FIG. 4. These brakes are selectively rendered operative in alternation with the associated clutch on the same roll, thereby retarding rotation of the roll from which the material is being removed, which roll is not then being positively driven, as will be hereinafter understood from the subsequent detailed description of the mode of operation of the apparatus.

The material to be washed or treated in the apparatus is supplied thereto in the form of a roll, indicated at 92 in FIG. 3 by broken lines, which roll may be introduced by placing the ends of its shaft into vertically extending grooves 93 provided on the inner side surfaces of the bearing supports or pedestals 29. The material in the roll 92 then rests upon the rubber covered roll therebeneath, such as 31, and the free end of the material is threaded between the toothed rolls within the tank 10 and then fastened to the roll 30 for winding thereabout. This threading operation may be facilitated by employing a fabric leader permanently attached to the roll 30, the free end of the leader being sewn to the free end of the material on the roll 92. During the threading operation the upper set of gear rolls 43, 44, 45 and 46 will be elevated through operation of the pistons within the cylinders 51 to 58. After the material has been threaded between the gear rolls, as shown in FIG. 3, fluid pressure is supplied to the cylinders 51 to 58 in a manner such that the upper set of gear rolls are lowered thus intermeshing them with the gear rolls 36 to 40 with the material 94, which is being treated, therebetween.

Preferably the apparatus includes means for removing excess liquid from the material 94 and for preventing curl thereof as it emerges from the tank 10 and before it is wound upon the receiving roll. In view of the fact that the material is moved alternately in reverse directions through the tank by the apparatus here illustrated, the means for removing excess water and preventing curl of the material are duplicated adjacent each of the rolls 30 and 31. Since these are identical, only one set thereof will be described in detail. As shown in FIG. 3, the means for removing excess liquid comprises angle irons or similarly shaped members 95 and 96 extending transversely of the tank 10 at an elevation above the overflow pipe 17 with the inner edges of the members 95 and 96 disposed so that they will, respectively, contact the under and upper surfaces of the material 94 and thus tend to scrape therefrom any liquid adhered thereto. After passing over the bars 95 and 96, the material 94 then passes over a roller 97 and over a third transversely extending bar 98. The roller 97 extends transversely of the tank and is mounted for rotation by suitable bearings supported on the structural framework for the tank.

The bar 96 is connected to sides of the tank 10 while the bars 95 and 98 are interconnected by suitable side members such as 99 which are pivoted concentrically with the roll 97 that is rotatably supported on the top edges of the tank. The material 94 is threaded around these bars and over the roll 97 as shown so that the bars 95 and 96 contact opposite surfaces of the material to remove excess liquid therefrom while the bar 98 contacts the under surface of the material 94 to prevent the edges thereof from curling under just prior to their reception on the wind-up roll 30 or 31. It will be apparent that the turning movement of the lower bar 95, due to contact of the material 94 therewith, is counterbalanced by the turning movement of the upper bar 98 thereby maintaining the bars 95 and 98 in contact with the material 94 for all diameters of the wind-up roll as the material is wound thereon. The lengths of the side or connection bars 99 between the transverse bars 95 and 98 and the center of pivot of the assembly may be selected in accordance with the dimensions of the apparatus and need not have the relative proportions as here shown. Likewise, the position of bar 96 may be changed from that illustrated so long as it contacts the material for all positions of bar 95 as the latter moves due to changes in position of bar 98 as the result of the changing diameter of the adjacent roll of material.

Elevation of the upper gear rolls 43, 44, 45 and 46 to facilitate threading of the material 94 between them and the lower gear rolls is effected by fluid pressure supplied from a suitable source 100 connected by conduits 101, 102 and pressure regulator 103 to a main valve 104, see FIG. 4. Operation of valve 104 to open position supplied air under pressure to conduit 105 from which the air is transmitted to the cylinders 51 and 52 through valve 106 and conduit 107. Likewise, the cylinders 53 and 54 are supplied with air under pressure through valve 108 and conduit 109. In a similar manner, cylinders 55 and 56 are supplied with air through valve 110 and conduit 111, while cylinders 57 and 58 are supplied through valve 112 and conduit 113. Hence, with each of the valves 104, 106, 108, 110 and 112 in operated or open position, each of the gear rolls 43, 44, 45 and 46 will be elevated. After the material 94 has been threaded between the gear rolls, the valve 104 is moved to the non-operated or closed position thus simultaneously cutting off the supply of air to each of the cylinders 51 to 58 so that all of the gear rolls 43, 44, 45, and 46 move to their lowermost positions as shown in FIG. 3 wherein the teeth of these gear rolls intermesh with the teeth of the lower gear rolls with the material 94 therebetween. Should it be desired to individually move the gear rolls of the upper set to their lowermost positions, this may be effected by leaving valve 104 in operated position and individually moving the valves 106, 108, 110 and 112 to their non-operated positions. This may be necessary, for example, during initial setup to check the extent of engagement of the teeth on the cooperating gear rolls and to effect adjustment of their positions. However, during normal operation of the machine, the valves 106, 108, 110 and 112 are left in operated position and the upper set of gear rolls are simultaneously moved through actuation of the single valve 104.

After the material 94 has been threaded between the two sets of gear rolls, the solvent liquid is introduced into the tank through the inlet pipe 15, the rate of flow being adjusted through operation of valves 16 and 18 to a desired value such that the quantity of liquid within the tank is continuously changed at the proper rate for optimum washing action, the level of the liquid being maintained by the overflow pipe 17. The temperature of the solvent liquid may be controlled to a suitable value by introducing steam or other temperature conditioning fluid through the inlet 19 under control of valve 20.

Movement of the material 94 through the apparatus and the repeated reverse flexing of contiguous transverse portions thereof is then initiated by starting the motor 67 thereby driving the gear rolls in the tank and the take-up roll. This operation is initiated by momentarily depressing the forward start switch 114 in the electric control circuit, see FIG. 5, which switch may be conveniently located in a control panel, not shown. Electric power is supplied to this control circuit from the usual three phase alternating current supply lines L1, L2, and L3 by closing a disconnect switch 115. This supplies electrical energy to the primary of a transformer 116, the secondary of which is connected with the main supply wires 117 and 118 of the control circuit. The start switch 114 is connected with the supply wire 117 through a stop switch 119, and hence momentary actuation of start switch 114 completes a circuit therethrough to a wire 120 connected to the coil of the forward start relay 121. This circuit is completed from the other side of the coil of the relay 121 through the contact 122b of the reverse start relay 122 to the supply wire 118.

Figure 5:
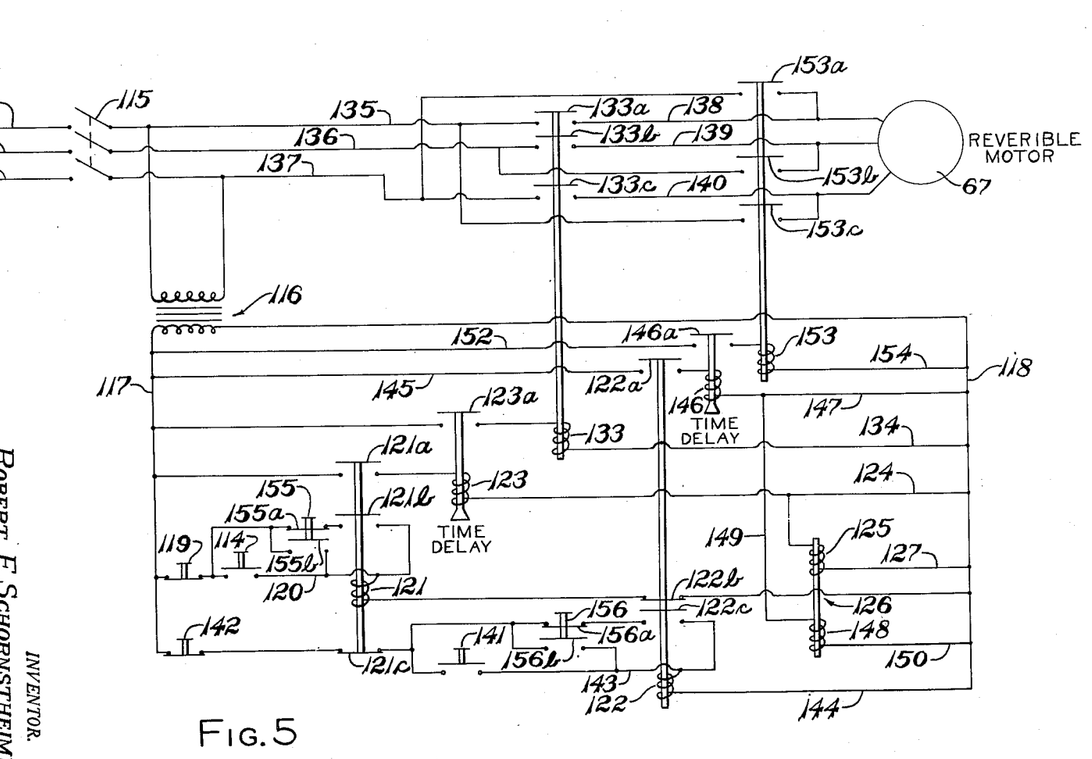
FIG. 5 is a simplified schematic wiring diagram representing the essential features of the electrical control circuit for the apparatus shown in FIGS. 1–4.

The resulting energization of the coil 121 causes it to move the contacts 121a and 121b to circuit closing position and the contact 121c to circuit opening position. Opening of contact 121c is a safety feature to prevent inadvertent energization of the reverse start relay 122. Crossing of contact 121b provides a holding circuit through the latter about the start switch 114 thus maintaining relay 121 energized after the start switch 114 is released. Closing of contact 121a completes a circuit through the latter connecting supply wire 117 to one terminal of the coil for a time delay relay 123, the circuit being completed from the other terminal of this coil through a wire 124 to the supply wire 118. Energization of the relay 123 does not immediately effect movement of its normally open contact 123a to circuit closing position since this relay is provided with conventional means delaying operation of its contact for a predetermined time after energization of the relay.

The closing of contact 121a and the resulting completion of the circuit through the coil of relay 123 has also, however, completed a circuit through a wire 124 to one terminal of coil 125 of a double acting solenoid operated valve 126, this circuit being completed from the other terminal of the coil 125 through the wire 127 connected with the supply line 118. Hence, the coil 125 is energized and moves the valve body 126a thereof to the position shown in FIG. 4. This provides communication from the air supply conduit 101 through the valve 126 to a conduit 128 connected with the clutch 82 on the roll 30. Also, air under pressure is supplied from the pipe or conduit 101 through the valve 126 to the conduit 129 connected with the brake 91 provided on the roll 31. Therefore, the apparatus is conditioned for driving of the roll 30 through the chain 85, when the motor 67 is energized, and simultaneously braking force is applied to the roll 31. This operation of valve 126 has also placed brake 90 in communication with atmosphere through a conduit 130 and an exhaust port 131 connected to the valve 126. Likewise, the clutch 83 for roll 31 is connected with the exhaust port 131 through a conduit 132. Hence, the clutch 83 is disengaged and the brake 90 is released.

When the predetermined time interval for which the relay 123 is set has elapsed, contact 123a is moved to circuit closing position. This completes a circuit extending from the supply wire 117 through the now closed contact 123a to one terminal of the coil of motor starting relay 133, the circuit being completed from the other terminal of the coil of this relay through the wire 134 connected with the power supply line 118. This energizes the motor starting relay 133 thereby moving its normally open contacts 133a, 133b, 133c to circuit closing positions. The closing of these contacts completes circuits extending from the power supply lines L1, L2, and L3, which are now connected with the wires 135, 136 and 137 through the previously operated switch 115, to the wires 138, 139 and 140 which are connected with the terminals of the three phase, reversible electric motor 67. Hence, the motor is started and continues to operate in the forward direction thereby driving the gear rolls in the tank 10 through the previously described drive train, the direction of motion being as indicated by the arrows in FIG. 3.

The operation of the gear rolls 36 to 40 and 43 to 46 effects the movement of the material 94 through the tank and at the same time causes repeated reverse flexing of contiguous portions of the material transversely of its length thereby assisting the liquid in the tank to remove the soluble substance from the material 94. The material 94 moving from the tank is taken up upon the roll 30 through rotation of the latter as the result of the previous engagement of clutch 82 and release of brake 90. The clutch 82 is of the conventional slipping type and is adjusted so that it slips before sufficient tension is applied to the material 94 to pull it from between the gear rolls 40 and 46, it being remembered that the power drive for the roll 30 is simply to effect windup of the material and is not for the purpose of pulling the material through the tank. In a similar manner, the brake 91 is adjusted so that it operates to place only sufficient drag upon the roll 31 to prevent the material 94 from leaving the roll faster than it is moved through the tank by the gear rolls. As the material 94 leaves the tank 10, excess liquid clinging to the under surface of the material is removed therefrom by the bar 95 and excess liquid on the upper or outer surface of the material is removed by the bar 96 while any tendency of the material to curl downwardly at the edges is prevented by passage over the bar 98 just prior to windup of the material upon the roll 30.

Preferably, the end of the material 94 is provided with a fabric leader which is secured to the roll 31. Hence, when the material 94 has completely passed through the liquid in the tank 10 the end of this leader appears adjacent the roll 30. The operator then stops the apparatus by momentarily depressing stop switch 119. This breaks the holding circuit for the coil of relay 121 deenergizing the latter thereby causing its contacts to return to the positions as indicated in FIG. 5. Hence, contact 121a moves to open position thus opening the circuit through the coil of relay 123 deenergizing the latter so that the contact 123a moves to open position. Opening of contact 123a deenergizes the motor start relay 133 so that the motor 67 is deenergized and stops, thus stopping movement of the material 94. The opening of contact 121a has also broken the circuit to coil 125 of the valve 126 so that this valve is now prepared for reverse operation.

The previously mentioned deenergization of relay 121, as the result of operating stop switch 119, has caused contact 121c to return to its circuit closed position illustrated in FIG. 5. Consequently, the apparatus is now prepared for running in the reverse direction which is initiated by momentary operation of reverse start switch 141. This completes a circuit extending from the supply wire 117 through the reverse stop switch 142, contact 121c, the now closed switch 141, and wire 143 to one terminal of the coil for the reverse start relay 122, the circuit being completed from the other terminal of this coil through a wire 144 to the power supply line 118. Relay 122 is therefore energized moving its contacts 122a and 122c to circuit closing positions and contact 122b to circuit opening position. The circuit closing position of contact 122c completes a circuit therethrough providing a holding circuit for the coil of relay 122, which circuit extends about the switch 141, so that the switch 141 may be released and the relay 122 will remain energized. Closing of contact 122a completes a circuit extending from the supply wire 117 through a wire 145 and contact 122a to and through the coil of a time delay relay 146, the circuit being completed from this relay through a wire 147 connected with the power supply wire 118. Energization of relay 146 does not, however, result in immediate movement of contact 146a of that relay since the relay is provided with conventional means for delaying operation of its contact to circuit closed position for a predetermined time after energization of the relay.

The closing of contact 122a has also energized coil 148 of the double acting valve 126 through a circuit comprising wires 147 and 149, the coil 148 and a wire 150 connected with the supply wire 118. The resulting energization of coil 148 moves the valve body 126a from the position shown in FIG. 4 to its opposite position. This results in terminating the supply of air under pressure through the conduits 128 and 129 and places these conduits in communication with the atmosphere through an exhaust port 151 in the valve. Also, the conduits 130 and 132 are no longer in communication with the exhaust port 131 but are now placed in communication with conduit 101 so that air under pressure is supplied to the clutch 83 and brake 90 operating these mechanisms while clutch 82 and brake 91 are disengaged. The apparatus is thus prepared to have roll 31 driven and roll 30 braked.

When the predetermined time interval for which the relay 146 is set has elapsed, contact 146a moves to circuit closing position thus completing a circuit from the supply wire 117 through the wire 152 and the now closed contact 146a to one terminal of the motor reverse start relay 153, the circuit being completed from the coil of this relay through wire 154 to the supply wire 118. Relay 153 is therefore energized and moves its contacts 153a, 153b, and 153c to circuit closing positions. Closing of contact 153a provides a circuit connecting wire 137 with wire 138 in the power supply circuit for motor 67, closing of contact 153b connects wire 136 to wire 139 in the motor power supply circuit, and closing of contact 153c connects wire 135 to wire 140 in the power supply circuit for motor 67. The drive motor 67 is therefore energized for rotation in the reverse direction and hence drives the gear rolls in the tank 10 in the reverse direction to that indicated in FIG. 3 thus moving the material 94 from the roll 30 to the roll 31. This movement on the material is effected with the aforementioned repeated reverse flexings of the material transversely of its path of travel due to action of the teeth of the gear rolls, the material being wound up upon roll 31 by the positive rotation of the latter as the result of the engagement of slip clutch 83, overrunning of the material from roll 30 being prevented by operation of the now engaged brake 90. Excess liquid clinging to the material 94 is removed as the material emerges from the tank 10 by engagement with transversely extending bars identical with those previously described in conjunction with the forward movement of the material.

When the material 94 has been completely removed from the roll 30 and passed through the liquid in the tank to the roll 31, as evidenced by the appearance of the leader attached to the end of the material, the movement of the material in the reverse direction is terminated by momentary actuation of stop button 142. This breaks the previously described circuit which maintains relay 122 energized so that the latter is now deenergized restoring its contacts to the positions shown in FIG. 5. This in turn deenergizes solenoid 148 and motor relay 153 so that the motor 67 is stopped and the valve 126 is prepared for a new operation. The material may then be returned through the tank in the forward direction by again momentarily actuating forward switch 114 whereupon the previously described operation and movement of the material in the forward direction is repeated. The material 94 is thus moved alternately in reverse directions through the tank 10 and is repeatedly washed by the action of the gear rolls and the constantly changing body of liquid in the tank.

When all, or substantially all, of the soluble substance has been removed from the material 94, an empty roll is introduced into the grooves such as 93 in the pedestals 29 and allowed to rest upon the now empty roll, such as roll 31. The adjacent end of the material 94 is then severed from the cloth leader attached to roll 31 and is placed about the empty roll resting upon the roll 31 after which the drive motor 67 is again energized in a direction to move the material towards the empty roll. In this operation, however, the material does not wind upon the roll 31 but rather upon the removable roll placed there-above, the latter being driven by the friction of the rubber covering on roll 31 thus causing the material 94 to wrap upon the removable roll. When the leader attached to the other end of the material 94 is adjacent the removable roll, the connection between this leader and material is severed and the roll of washed material is removed from the apparatus. A new roll of non-washed material such as 92 is then introduced into the appartus, the end of this non-washed material is connected with the leader extending through the tank, and the washing operation is resumed with the material being wound upon the roll 30 whereupon the apparatus is stopped and this end of the material is connected to the leader on roll 31. Thereafter washing of the material is effected by repeatedly moving it through the tank, winding the material first upon one roll 30 and then upon the other roll 31 with repeated transverse flexure of the material by the gear rolls, as will now be readily apparent.

During the period of introduction of non-washed material into the apparatus, it is sometimes desirable to effect intermittent operation of the apparatus in either direction without the necessity of employing the usual forward and stop switches. Consequently, the control circuit is provided with forward and reverse jog switches 155 and 156, respectively. The forward jog switch 155 has a normally closed contact 155a and a normally open contact 155b. Hence, momentarily actuation of the switch 155 opens the circuit through contact 155a thus preventing continuous operation of the apparatus. The simultaneous closing of contact 155b completes a circuit through the latter energizing the forward relay 121 thus effecting energization of solenoid 125 moving valve 126 to the position shown in FIG. 4. Also, the circuit to the reverse relay 122 is opened and the motor 67 is started a predetermined time thereafter through delayed closing of contact 123a as a result of operation of relay 123 as previously described. Now, however, no holding circuit is provided and hence the motor 67 and solenoid 125 of valve 126 remain energized only so long as switch 155 is held operated. Upon release of this switch the energizing circuits are broken and the control circuit returns to the condition shown in FIG. 5 thus stopping the apparatus. In a similar manner, the reverse jog switch 156 operates through its contacts 156a and 156b to permit control of movement of the apparatus in the reverse direction so long as the reverse jog switch is held actuated. These jog switches may be located at a position such that the operator may observe the action of the apparatus so that he can readily start and stop the same which is especially important during initial set-up and adjustment of the apparatus.

In the illustrated embodiment of the apparatus nine gear rolls have been shown so positioned that the material passes through eight sets of intermeshed gear teeth. The gear teeth profiles are of standard 14½ degree pressure angle with the rolls each having forty-six teeth and a pitch diameter of 5¾". The material processed contained finely divided sodium chloride embedded in a film of polyvinyl chloride, which had a fabric backing, and water was utilizing as the solvent in the tank. The rate of movement of the material through the tank was in the order of 100 yards per minute and the number of complete passes of the material through the tank for removal of all of the solvent was in the order of 30 times. It will be understood, however, that these dimensions and values are given only by way of illustration of a specific embodiment of the apparatus and an example of the mode of practicing of the method. Obviously, the time required for complete removal of the soluble substance and hence the number of passes of the material through the apparatus, as well as the rate of movement therethrough, depends upon the nature of the material, the solvent, the number and size of the gear rolls, and other factors which can be readily varied by those skilled in the art. Where the material is polyvinyl chloride containing salt and the solvent is water, the temperature of the water should preferably not exceed 160° F. in order to prevent excessive edge curl of the material. Lower temperatures may, of course, be employed but a longer washing period will then be required for equivalent removal of the salt.

It will be understood that the invention is not limited to use with films of polyvinyl chloride containing salt but may be utilized with films or webs of other materials of similar nature. Nor is it necessary to utilization of the invention that the finely divided soluble substance in the material treated be sodium chloride. Moreover, while the invention has been specifically described with respect to repeatedly moving the material through the apparatus, it will be apparent that it would be possible to effect equivalent washing action while the material is moving in a single direction by increasing the number of gear rolls and effecting other obvious changes in the procedure and apparatus. These and other variations in the procedural steps and details of the apparatus, which will be readily apparent to those skilled in the art, are therefore deemed encompassed within the ambit of the invention which is limited only by the spirit and scope of the appended claims.

Having thus described the invention, I claim:

1. The method of rendering air pervious flexible impervious sheet material containing a finely-divided soluble substance comprising rotatably supporting in a container for a liquid a plurality of rolls having spaced radial projections thereon with the axes of the rolls in staggered parallel relationship such that the projections on adjacent rolls are adapted to interfit, threading a portion of the material sequentially between said rolls, engaging the projections on adjacent rolls with the material in a manner such that a projection on one roll forces the material into the space between two adjacent projections on an adjacent roll, continuously supplying to the container and removing therefrom a liquid which is a solvent for the soluble substance in the material at a rate such that the material is immersed in a continuously replaced quantity of the solvent while engaged by said rolls, and driving said rolls in the direction to move the material through the liquid in an undulating path with repeated reverse flexing of contiguous portions of the material transversely of the path of movement thereof.

2. The method of rendering air pervious flexible impervious sheet material containing a finely-divided soluble substance comprising rotatably supporting in a container for a liquid a plurality of rolls having spaced radial projections thereon with the axes of the rolls in staggered parallel relationship such that the projections on adjacent rolls are adapted to interfit, threading a portion of the material sequentially between said rolls, engaging the projections on adjacent rolls with the material in a manner such that a projection on one roll forces the material into the space between two adjacent projections on an adjacent roll, continuously supplying to the container and removing therefrom a liquid which is a solvent for the soluble substance in the material at a rate such that the material is immersed in a continuously replaced quantity of the solvent while engaged by said rolls, and driving said rolls cyclically first in one direction and then in the reverse direction to thereby move the material back and forth through the liquid in an undulating path with repeated reverse flexing of contiguous portions of the material transversely of the path of movement thereof.

3. The method of removing a soluble substance from flexible sheet material comprising rotatably supporting in a container for a liquid a plurality of rolls having gear-type teeth with the teeth thereof extending axially and with the axes of the rolls in staggered parallel relationship, threading a portion of the material sequentially between said rolls, engaging the teeth on adjacent rolls with the material in a manner such that the teeth on one roll force the material into spaces between the teeth on each of two adjacent rolls, continuously supplying to the container and removing therefrom a liquid which is a solvent for the soluble substance in the material at a rate such that the material is immersed while engaged by said rolls in a continuously replaced quantity of the solvent, and driving said rolls cyclically first in one direction and then in the reverse direction to thereby move the material back and forth through the liquid in an undulating path with repeated reversed flexing of contiguous portions of the material transversely of the path of movement thereof.

4. The method of rendering air pervious flexible impervious ploymeric material in sheet form and containing finely divided salt embedded therein comprising rotatably supporting in a container for a liquid a plurality of rolls having gear-type teeth with the teeth thereof extending axially and with the axes of the rolls in staggered parallel relationship, threading a portion of the material sequentially between said rolls, engaging the teeth on adjacent rolls with the material in a manner such that the teeth on one roll force the material into spaces between the teeth on each of two adjacent rolls, continuously supplying water to the container and removing it therefrom at a rate such that the material is immersed in a continuously replaced quantity of the water while engaged by said rolls, and driving said rolls cyclically first in one direction and then in the reverse direction to thereby move the material back and forth through the water in an undulating path with repeated reverse flexing of contiguous portions of the material transversely of the path of movement thereof.

5. An apparatus forremoving a soluble substance from flexible sheet material comprising a container for a liquid, means to maintain a substantially constant volume of continuously changing liquid in the container, a plurality of toothed rolls, means rotatably supporting the rolls in said container with their axes extending in parallel staggered relationship, means for moving certain of the rolls transversely of their axes to and from positions in which the teeth thereof are intermeshed with the teeth on adjacent ones of the other rolls and with the material therebetween, and means to drive said rolls to thereby move the material through the liquid with repeated reverse flexing of the material transversely of its path of movement.

6. An apparatus as defined in claim 5 and further comprising means to introduce a heating medium into said container to control the temperature of the liquid contained therein.

7. An apparatus for removing a soluble substance from flexible sheet material comprising a container for a liquid, means to introduce a liquid into and remove it from said container in a manner providing a substantially constant volume of continuously changing liquid in the container, a plurality of toothed rolls each having the teeth thereof extending parallel with the axis of the roll, means rotatably supporting the rolls in said container with their axes extending in parallel staggered relationship, means for moving certain of the rolls transversely of their axes to and from positions in which the teeth thereof are intermeshed with the teeth on adjacent ones of the other rolls and with the material therebetween, means to drive said rolls to thereby move the material through the liquid with repeated reverse flexing of the material transversely of its path of movement, and a plurality of elongated members supported in parallel spaced relationship above the level of the liquid in the container and transversely of the material as it emerges from the liquid, there being at least one of said members on each side of the material and positioned to contact the latter for removing excess liquid therefrom and reduce curl thereof.

8. An apparatus as defined in claim 7 wherein said elongated members are metal bars with longitudinal edge portions contacting the material and two of said bars are connected together and pivoted on the container to permit automatic accommodations of the bars to change in the path of material.

9. An apparatus for removing a soluble substance from flexible sheet material comprising a container for a liquid, means to introduce a liquid into and remove it from said container in a manner providing a substantially constant volume of continuously changing liquid in the container, a plurality of toothed rolls each having the teeth thereof extending parallel with the axis of the roll, means rotatably supporting the rolls in said container with their axes extending in parallel staggered relationship, means for moving certain of the rolls transversely of their axes to and from positions in which the teeth thereof are intermeshed with the teeth on adjacent ones of the other rolls and with the said material interposed therebetween, the said means for moving certain of said rolls including means to adjust the pressure exerted by the movable rolls upon the material between the rolls, and means to drive said rolls to thereby move the material through the liquid with repeated reverse flexing of the material transverse of its path of movement.

10. An apparatus for removing a soluble substance from flexible sheet material comprising a container for a liquid, means to introduce a liquid into and remove it from said container in a manner providing a substantially constant volume of continuously changing liquid in the container, a plurality of toothed rolls each having the teeth thereof extending parallel with the axis of the roll, means rotatably supporting the rolls in said container with their axes extending transversely of the container and in parallel relationship, a second plurality of toothed rools each having its teeth extending axially, means individually rotatably supporting said second plurality of rolls in said container, the second-mentioned supporting means each being movable transversely of the axes of the rolls to and from positions in which the said second plurality of rolls engage with the first plurality of rolls, means to guide a strip of the sheet material into and from said container and between said rolls, means to selectively individually or simultaneously move said second-mentioned supporting means to and from positions in which the teeth of the rolls supported thereby are intermeshed with the teeth on the first-mentioned plurality of rolls with the said material interposed between the interengaged teeth, and means to drive said rolls to thereby move the material through the liquid.

11. An apparatus for removing a soluble substance from flexible sheet material comprising a container for a liquid, means to introduce a liquid into and remove it from said container in a manner providing a substantially constant volume of continuously changing liquid in the container, a plurality of toothed rolls each having the teeth thereof extending parallel with the axis of the roll, means rotatably supporting the rolls in said container with their axes extending in parallel staggered relationship, means for moving certain of the rolls transversely of their axes to and from positions in which the teeth thereof are intermeshed with the teeth on adjacent ones of the other rolls and with the material therebetween, a let-off roll for the material supported above the level of the liquid in the container, a wind-up roll for the material supported above the level of the liquid in the container, means to drive said toothed rolls to thereby move the material through the liquid, means controlling the speed of rotation of said let-off roll, and means rotating said wind-up roll at a speed related to the speed of the toothed rolls such that the tension on the material does not exceed a predetermined amount.

12. An apparatus for removing a soluble substance from flexible sheet material comprising a container for a liquid, means to introduce a liquid into and remove it from said container in a manner providing a substantially constant volume of continuously changing liquid in the container, a plurality of toothed rolls each having the teeth thereof extending parallel with the axis of the roll, means rotatable supporting the rolls in said container with their axes extending transversely of the container and in parallel staggered relationship, means for moving certain of the rolls transversely of their axes and from positions in which the teeth thereof are intermeshed with the teeth on the adjacent ones of the other rolls and with the material therebetween, a let-off roll for the material supported above the level of the liquid in the container, a wind-up roll for the material supported above the level of the liquid in the container, reversible means to drive said toothed rolls to thereby move the material through the liquid in either direction, separate driving connections between said toothed roll drive means and said let-off and wind-up rolls respectively, and means to alternately render said separate driving connections operative so that the functions of the let-off and wind-up rolls are reversed.

13. An apparatus as defined in claim 12 wherein said driving connections each include a clutch capable of slipping when the torque transmitted thereby exceeds a predetermined amount, and the said means to alternately render the driving connections operative includes means for rendering one of said clutches operative and simultaneously rendering the other of said clutches inoperative.

14. An apparatus as defined in claim 12 wherein said let-off and said wind-up rolls are each provided with brake means and means to operate said brake means in alternation with rendering operative the alternatively employed driving connections, whereby when one of the said rolls above the surface of the liquid is driven the other of these rolls is braked.

15. An apparatus for removing a soluble substance from flexible sheet material comprising a container for a liquid, means to introduce a liquid into and remove it from said container in a manner providing a substantially constant volume of continuously changing liquid in the container, a plurality of toothed rolls each having the teeth thereof extending parallel with the axis of the roll, means rotatably supporting the rolls in said container with their axes extending in parallel staggered relationship, means for moving certain of the rolls transversely of their axes to and from positions in which the teeth thereof are intermeshed with the teeth on adjacent ones of the other rolls and with the material therebetween, a first roll for the material rotatably supported above the level of the liquid in the container and adjacent one end thereof, a second roll for the material rotatably supported above the level of the liquid in the container adjacent the other end thereof, reversible means to drive said toothed rolls to thereby move the material through the liquid, separate driving connections between said drive means and said first and second material rolls respectively, the said separate driving connections each including a slip clutch, a separate brake for the said first and second rolls for the material, and control means to engage the clutch in one driving connection and release the brake of the material roll driven thereby and substantially simultaneously apply the other brake and release the clutch in the other driving connection when the drive for the toothed rolls is reversed.

16. The method of rendering air previous flexible impervious sheet material containing a finely-divided soluble substance which method comprises moving said material through a flowing body of liquid which is a solvent for the substance, repeatedly reversely deflecting the moving material transversely of the direction of movement thereof through the liquid, superposing on each of said reverse deflections a plurality of repeated reverse flexings of contiguous portions of the material transversely of its movement, and repeating the movement of the material through the liquid and effecting reverse deflections and flexings thereof during the movement until substantially all of the soluble substance has been removed from the material thereby providing minute pores therein.

17. The method of rendering air pervious flexible impervious sheet material containing finely-divided soluble substance embedded in the material which method comprises providing a container for a liquid, continuously introducing into and removing from said container a liquid which is a solvent for the substance, passing said material through said liquid in one direction while repeatedly reversely deflecting contiguous portions of the moving material transversely of the direction of movement thereof through the liquid, repeatedly reversely flexing contiguous portions of the material transversely of its movement a plurality of times during each of said deflections thereof, reversing the direction of movement of the material so that it is returned through the liquid, repeating the reverse deflecting and flexing of contiguous portions of the material transversely thereof during the said return movement, and repeating the passage of the material forward and backward through the liquid with reverse deflections and flexing transversely of the material until substantially all of the soluble substance has been removed thereby providing minute pores in the material.

References Cited in the file of this patent

UNITED STATES PATENTS

| | | |
|---|---|---|
| 1,937,077 | West | Nov. 28, 1933 |
| 2,090,669 | Dreyfus et al. | Aug. 24, 1937 |
| 2,133,231 | Schermer | Oct. 11, 1938 |
| 2,190,529 | Bretschneider | Feb. 13, 1940 |
| 2,241,225 | Talbot | May 6, 1941 |
| 2,490,178 | Kroon | Dec. 6, 1949 |
| 2,504,208 | Locke | Apr. 18, 1950 |
| 2,634,221 | McAlpine et al. | Apr. 7, 1953 |
| 2,730,113 | Hadley | Jan. 10, 1956 |
| 2,753,592 | Cochran | July 10, 1956 |
| 2,806,256 | Smith-Johannsen | Sept. 17, 1957 |